(12) United States Patent
Hinsberger

(10) Patent No.: US 10,612,567 B2
(45) Date of Patent: Apr. 7, 2020

(54) VALVE DEVICE

(71) Applicant: HYDAC SYSTEMS & SERVICES GMBH, Sulzbach/Saar (DE)

(72) Inventor: Kenny Hinsberger, Quierschied (DE)

(73) Assignee: HYDAC SYSTEMS & SERVICES GMBH, Sulzbach/Saar (DE)

( * ) Notice: Subject to any disclaimer, the term of this patent is extended or adjusted under 35 U.S.C. 154(b) by 0 days.

(21) Appl. No.: 16/302,935

(22) PCT Filed: May 10, 2017

(86) PCT No.: PCT/EP2017/000569
§ 371 (c)(1),
(2) Date: Nov. 19, 2018

(87) PCT Pub. No.: WO2017/202485
PCT Pub. Date: Nov. 30, 2017

(65) Prior Publication Data
US 2019/0277313 A1    Sep. 12, 2019

(30) Foreign Application Priority Data

May 25, 2016 (DE) .......... 10 2016 006 545

(51) Int. Cl.
*F15B 13/043* (2006.01)
*F15B 13/04* (2006.01)
(Continued)

(52) U.S. Cl.
CPC .......... *F15B 13/0405* (2013.01); *F15B 1/024* (2013.01); *F15B 1/033* (2013.01);
(Continued)

(58) Field of Classification Search
CPC .............. F15B 13/0405; F15B 13/0426; F15B 13/0433; F15B 13/025; F15B 1/024;
(Continued)

(56) References Cited

U.S. PATENT DOCUMENTS 4,204,458 A * 5/1980 Kononov ................ F15B 21/12
137/596.14
4,311,296 A * 1/1982 Scheffel .............. F15B 13/0405
251/29
(Continued)

FOREIGN PATENT DOCUMENTS

DE    36 04 410    8/1986
DE    689 09 069    2/1994
(Continued)

OTHER PUBLICATIONS

International Search Report (ISR) dated Jul. 28, 2017 in International (PCT) Application No. PCT/EP2017/000569.

*Primary Examiner* — Minh Q Le
(74) *Attorney, Agent, or Firm* — Wenderoth, Lind & Ponack, L.L.P.

(57) ABSTRACT

A valve device with pressure-reducing function, comprised of at least
one logic valve (V1);
one lock valve (V2); and
one pressure-reducing valve (V3),
wherein the inlet (1) of the logic valve (V1) may be connected to a pressure supply source (HD), characterized in that the outlet (V1.2) of the logic valve (V1) and the outlet (V3.1) of the pressure reducing valve (V3) are connected together to an outlet or user port (A); and that the lock valve (V2) is connected with its inlet (V2.1) to the inlet (V1.1) of the logic valve (V1) as well as to a control side (V1.3) of the same, and with its outlet (V2.2) to an inlet (V3.2) of the pressure-reducing valve (V3).

9 Claims, 3 Drawing Sheets

Figure 3:
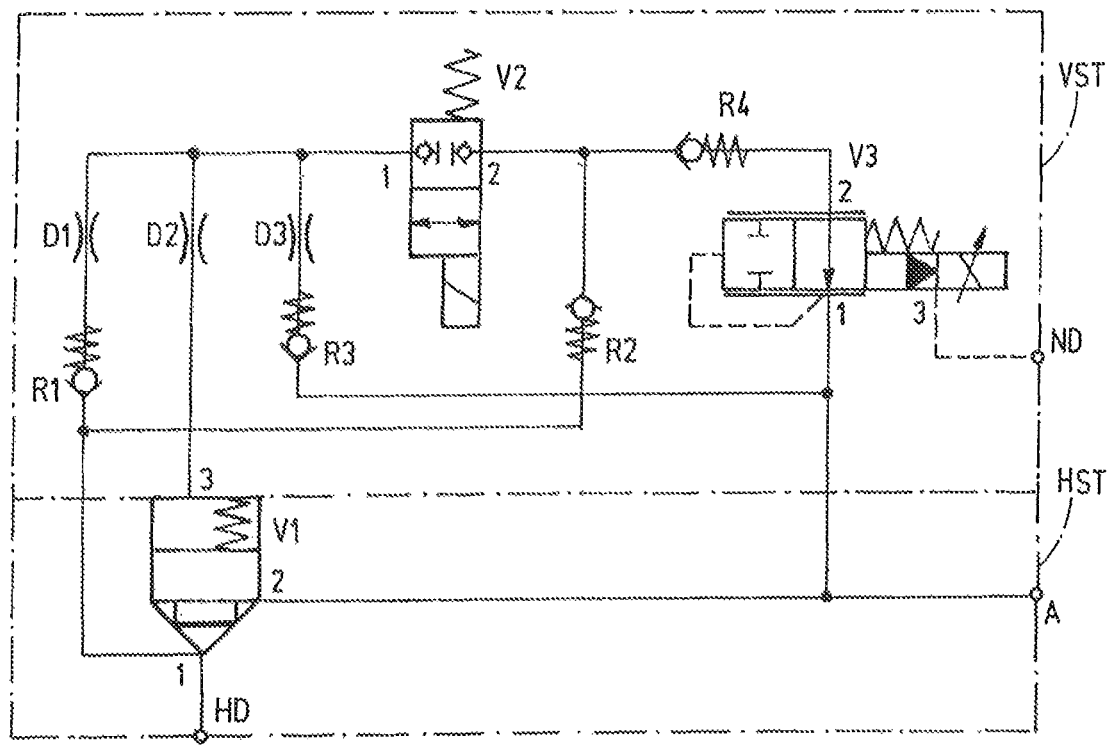

(51) Int. Cl.
*F15B 1/02* (2006.01)
*F15B 1/033* (2006.01)
*F15B 13/02* (2006.01)
*G05D 16/10* (2006.01)
*F16H 61/4096* (2010.01)
*G05D 16/20* (2006.01)
*F15B 13/042* (2006.01)

(52) U.S. Cl.
CPC ....... *F15B 13/025* (2013.01); *F16H 61/4096* (2013.01); *G05D 16/10* (2013.01); *G05D 16/204* (2013.01); *F15B 13/0426* (2013.01); *F15B 13/0433* (2013.01); *F15B 2211/212* (2013.01); *F15B 2211/50554* (2013.01); *F15B 2211/613* (2013.01); *F15B 2211/625* (2013.01); *F15B 2211/7058* (2013.01)

(58) Field of Classification Search
CPC ............... F15B 1/033; F15B 2211/212; F15B 2211/50554; F15B 2211/613; F15B 2211/625; F15B 2211/7058; G05D 16/10; G05D 16/204; F16H 61/4096
USPC ...................... 137/596, 487.5, 489.5, 596.14
See application file for complete search history.

(56) References Cited

U.S. PATENT DOCUMENTS

| | | | |
|---|---|---|---|
| 4,711,267 A | 12/1987 | Schwelm | |
| 5,137,254 A | 8/1992 | Aardema et al. | |
| 5,170,692 A * | 12/1992 | Lonnemo | F15B 13/0405 60/459 |
| 8,833,391 B2 * | 9/2014 | Andersson | F15B 13/01 137/596.14 |
| 9,784,374 B2 * | 10/2017 | Ikeda | F16K 31/408 |
| 2010/0043519 A1 * | 2/2010 | Schaltegger | B21D 24/14 72/352 |
| 2012/0204974 A1 * | 8/2012 | Sakasegawa | G01F 5/00 137/486 |
| 2013/0209276 A1 * | 8/2013 | Hugosson | E02F 9/2203 417/53 |
| 2014/0144130 A1 * | 5/2014 | Vigholm | E02F 9/2207 60/327 |
| 2015/0135699 A1 * | 5/2015 | Stephan | F15B 13/044 60/428 |
| 2016/0011601 A1 * | 1/2016 | Inagaki | F16H 61/0206 700/282 |
| 2016/0069465 A1 | 3/2016 | Suzuki | |
| 2017/0342686 A1 * | 11/2017 | Jeon | E02F 9/22 |
| 2018/0347599 A1 * | 12/2018 | Terao | F16K 1/00 |

FOREIGN PATENT DOCUMENTS

| | | |
|---|---|---|
| DE | 10 2012 005 594 | 9/2013 |
| DE | 10 2012 020 066 | 4/2014 |
| DE | 10 2014 000 695 | 7/2015 |
| DE | 11 2013 006 960 | 1/2016 |
| DE | 10 2014 219 634 | 3/2016 |
| EP | 0 602 036 | 5/1996 |

* cited by examiner

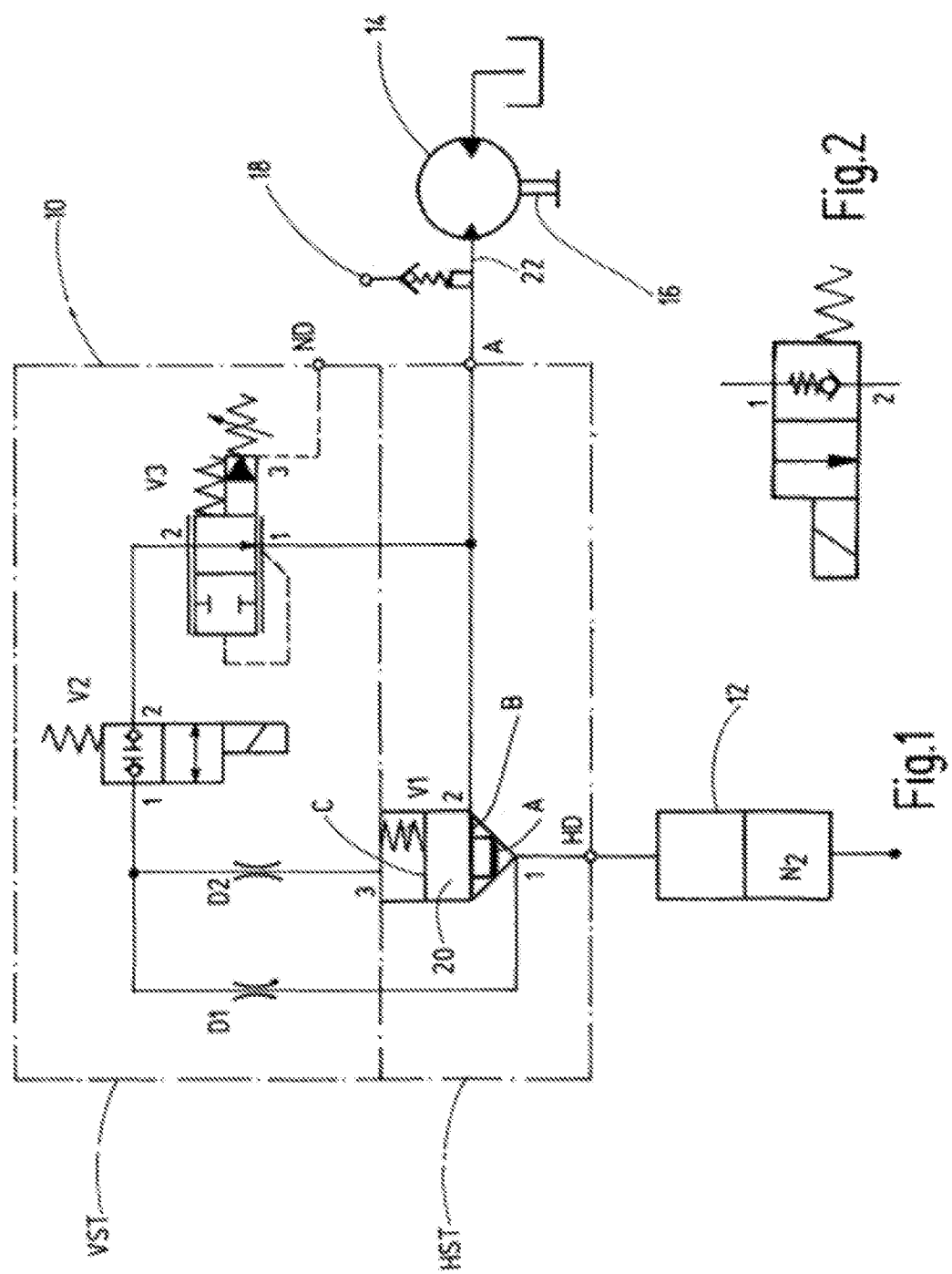

VALVE DEVICE

The invention concerns a valve device with a pressure-reducing function.

The document DE 10 2014 000 695 A1 discloses a valve device for blocking and for pressure adjustment, in particular provided for use in mobile machinery with at least one hydraulic actuator device and an accumulator device, in which the fluid connection may be connected or disconnected from each other by means of a first valve device in form of a logic valve.

Due to the fact that in the known solution, prior to making the fluid-conducting connection via the first valve device, a controlled pressure equalisation is initiated between the actuator device and the accumulator device via an equalisation device in form of a locking or unloading valve in order to prevent an abrupt pressure equalisation, any existing pressure difference between the actuator device and the accumulator device is initially released via a further, preferably a restricted fluid connection to such a level at which the first valve device in form of a logic valve can be opened at a pressure level at which the actuator and accumulator devices are already, so that a jerky, uncontrolled movement to the driving axle of the respective machine is effectively prevented and the desired spring-damping behaviour is achieved immediately without jerking.

Moreover, the document DE 10 2014 219 634 A1 discloses a pressure-reducing valve with separate radial boreholes to provide different fluid flow paths. To that extent the known solution concerns a hydraulic cartridge valve with a connector in a first longitudinal borehole, which forms an outlet connection port by means of an opening at the end-face, wherein the first longitudinal borehole houses a linearly moveable piston, wherein the connector in the vicinity of an inlet connection port is crossed by at least one first radial borehole that extends in radial direction to the longitudinal axis, wherein the connector in the vicinity of a return connection port is crossed by at least one second radial borehole that extends in radial direction to the longitudinal axis, which is disposed at a distance in the direction of the longitudinal axis to the at least one first radial borehole, wherein a first fluid flow path extends from the inlet connection port to the outlet connection port, and wherein a second fluid flow path extends from the outlet connection port to the return connection port.

In the known solution the piston is provided with at least a third radial borehole, which extends in radial direction to the longitudinal axis, wherein it is part of the first fluid flow path, wherein the piston is provided with at least a fourth radial borehole that extends in radial direction to the longitudinal axis, wherein it is part of the second fluid flow path, and wherein it is disposed at a distance in the direction of the longitudinal axis to the at least one third radial borehole. Thus in the known solution there are different radial boreholes provided in the piston for the first and the second fluid flow path, each of which can be adapted specifically to the assigned flow conditions. The known cartridge valve is thus designed to adjust the pressure at the outlet connection port through displacement of the piston to a predetermined value. The known solution is implemented as a 3-way pressure-reducing valve in cartridge form.

The document DE 11 2013 006 960 T5 discloses a valve device with a pressure-reducing function comprised of at least one logic valve, a lock valve and a pressure-reducing valve, wherein the input of the logic valve may be connected to a pressure supply source. The documents EP 0 602 036 B1 and DE 36 04 410 A1 disclose valve devices.

Based upon said prior art it is the object of the invention to provide a valve combination for limiting the pressure on the secondary side, that is, with a pressure reducing function as it is known from a 2-way pressure-reducing valve, which is simple and cost-effective to produce.

A valve device with a pressure-reducing function according to the characteristics of claim 1 meets said object. According to the attribute of claim 1, the valve device according to the invention is characterized in that the output of the logic valve and the output of the pressure-reducing valve are both connected to an outlet or user connection, and that the lock valve is connected with its input to the input of the logic valve as well as to a control side of the same, and is connected with its output to an input of the pressure-reducing valve. The valve device constitutes a physical unit comprised of at least three valves that differ from each other. The primary valve in form of a logic unit, in particular in form of a logic valve, shuts off both fluid-conducting main connection ports of the device from each other in a leak-proof manner, which in the opened state of the valve ensures that the volume supply for a connected user is provided, or conversely, serves to fill a connected accumulator. The lock valve is preferably designed as a 2-way poppet valve and, when actuated, opens up the flow cross-section and thus the function at the outlet for a connected user. The secondary valve is in its function a 2-way pressure-reducing valve and works in conjunction with the lock valve as a servo control unit for the primary valve in form of the logic valve. In a preferred embodiment it is possible to employ in addition two nozzles inside the valve device, which may cause a pressure drop in full flow, or have a movement-dampening effect. If necessary the number of nozzles may be reduced to one nozzle.

In a preferred embodiment of the valve device according to the invention provision is made that at least the lock valve together with the pressure-reducing valve and the two said nozzles form the servo control unit for an exchangeable main control unit with the logic valve. This provides in an advantageous manner the option to adapt the main control unit, depending on power requirements, to a large extent to the overall unit whilst retaining the servo control unit unchanged. Thus the pilot control unit remains unchanged for all power stages, and only the main control unit in form of the logic unit or logic valve respectively is adapted to the power requirements (variation of the nominal value).

If the pressure-reducing valve of the servo control unit is provided as a proportional valve that is operated at maximum current, or is set to the maximum pressure in operation, the valve device as a unit may overall be operated as a lock valve through operating the lock valve of the servo control stage. In this variation the unit is equivalent to the hydraulic circuit of a 2-way poppet valve in Z-format. In this operating mode the logic valve is operated with maximum piston stroke, making the precision control geometry ineffective. This allows the maximum flow cross-section to be utilised and the pressure drop is reduced to a minimum.

If the valve device unit, as described above, is implemented as a proportional pressure reducing valve operated at maximum current and expanded by corresponding advantageously placed lock valves in the servo control stage, and if the logic valve is implemented with a pronounced control surface at the valve connection for the outlet, it is equivalent to the hydraulic circuit of a 2-way poppet valve in W-format. Also in this mode the logic valve is operated with maximum piston stroke whilst the precision control geometry is out of action, which allows the maximum flow cross-section to be utilised and the pressure drop is reduced to a minimum.

It has proven to be particularly advantageous to use the valve device with a hydraulic motor in accordance with the invention. To operate said hydraulic motor with constant pressure, supplied from a source with variable pressure, for example in form of a hydraulic accumulator, the valve device described may be applied according to the invention.

Further advantageous embodiments of the valve device according to the invention are subject to the dependent claims.

Figure 4:
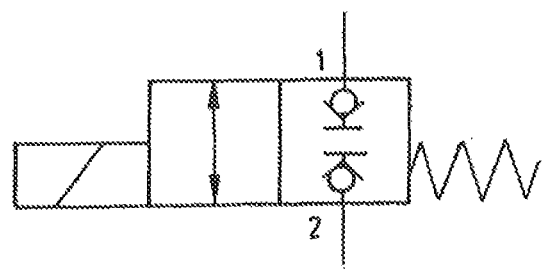
Figure 6:
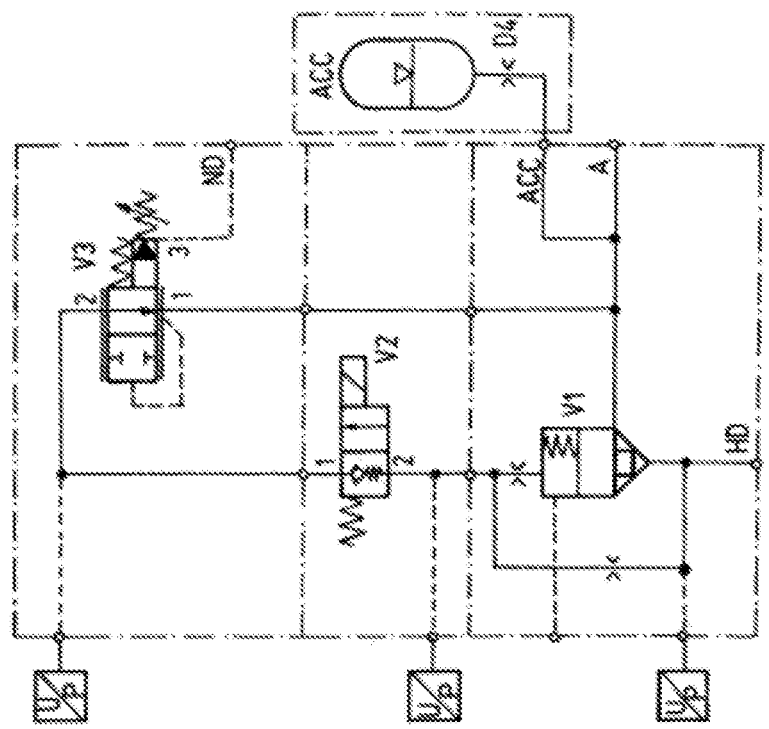
Figure 5:
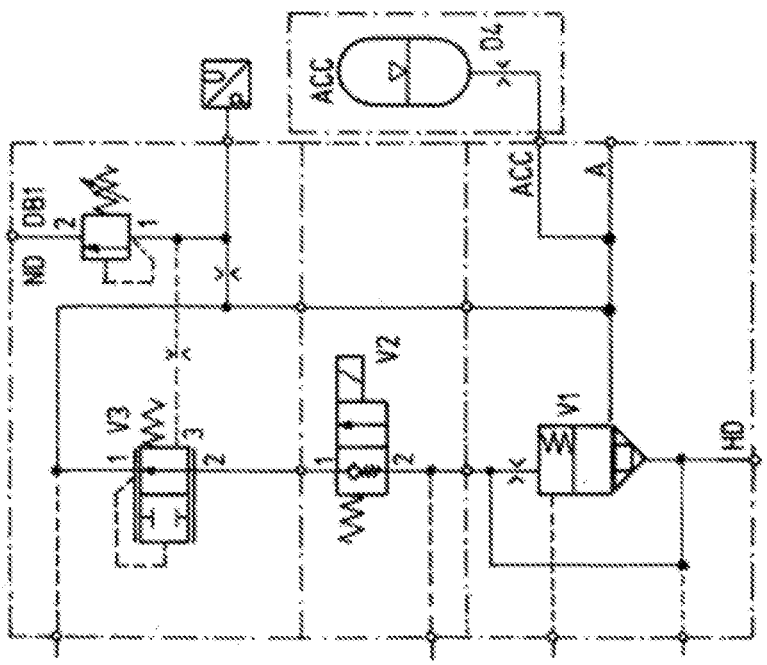

The valve device according to the invention will now be described in greater detail by way of different exemplary embodiments in the drawing. Schematic representations in form of hydraulic diagrams are showing in:

FIG. 1 the essential components of the valve device according to the invention with connected hydraulic motor as user and a hydraulic energy store;

FIG. 2 the implementation of the valve device according to FIG. 1 as 2-way poppet valve in Z-format;

FIG. 3 a valve device according to FIG. 1 with modified servo control unit with lock valves and with a pressure reducing valve in form of a proportional unit;

FIG. 4 a circuit equivalent to FIG. 2 for the implementation as 2-way poppet valve in W-format according to FIG. 3; and FIGS. 5 & 6 in an "unravelled" diagrammatic depiction, practical implementation options for a hydraulic motor supply, wherein the FIG. 6 corresponds in terms of content largely to the representation in FIG. 1.

The unit 10 shown in FIG. 1 is a valve combination for a secondary-side pressure limitation, comparable to the pressure-reduction function in a 2-way pressure-reducing valve. The unit 10 is essentially comprised of three different valves. The primary valve in form of a logic valve V1 shuts both main ports HD, A off from each other in a leak-proof manner. The secondary valve V3, which in its function takes the form of a 2-way pressure-reducing valve, acts as a servo control unit for the logic valve V1. The 2-way poppet valve takes the form of a lock valve and, when operated, opens up the flow cross-section and thus the function for port 1. In addition there are two nozzles D1, D2, which create a pressure drop (D1) under flow conditions, or have a movement-damping effect (D2). Of the two nozzles D1 and D2, the nozzle D1 is necessary for the required function.

In this circuit a hydraulic energy store in form of a hydraulic accumulator 12 is connected to the port HD, or some other pressure source in form of a constant pressure source or variable pressure source. A user is connected to port A, in this instance in form of a hydraulic motor 14, which is preferably part of a traction drive 16. Such hydraulic motor traction drives are commonly used and are therefore not described in detail. The hydraulic motor 14 is supplied at its input from a pressure supply source 18 with a fluid of a specified pressure, for example an input pressure of 30 bar. At the outlet the hydraulic motor 14 is connected to a tank T. The aim of this circuit is to control the pressure at the supply port A to a set value by means of unit 10. The port ND of unit 10 serves to drain the servo control oil from the pressure-reducing valve V3. This circuit may be used for any kind of displacement unit, that is, besides hydraulic motors 14 also for hydraulic pumps (not shown).

To achieve the intended function of the unit there has to be a minimum pressure drop between the ports HD and A ($p_1 > p_2$). Said minimum pressure drop is due to inherent system factors, such as internal friction, flow losses and spring forces and is thus primarily dependent on the valves V1, V2, V3 and the nozzles D1, D2 themselves. In the following description it is assumed that a hydraulic capacity, in this instance in form of the hydraulic accumulator 12, is attached to port HD. Concerning the pressure supply source it is only important that the supply pressure varies as little as possible at port HD, but it does not necessarily have to be constant.

The port A is connected to the hydraulic user, in this instance the hydraulic motor 14. However, other hydraulic users may be connected to the unit 10 such as, for example, hydraulic pumps. To that extent the port A constitutes the outlet line, the pressure of which is a result of the inflowing and outflowing volume at the user 14. The volume outflow or the volume withdrawal takes place through the hydraulic user, whatever that may be; in this instance it takes the form of the hydraulic motor 14. The volume supply takes place primarily via the flow cross-section opened up by the logic valve V1 and the pressure drop across it. The port ND is only required to drain the servo control oil of valve V3. Although said port only drains the servo control oil and serves no function-related task for valve unit 10, the hydraulic pressure at this point should not be subject to larger fluctuations since this pressure affects the set pressure value of the valve-internal servo control for the pressure reducing valve V3 and thus has a direct influence on the functional stability of the entire unit 10.

The logic valve V1 in the variant implemented here is a classic 2-way cartridge valve and is equivalent to a so-called logic unit with precision control geometry with three effective areas. The pressure of valve port V1.1 acts on the primary effective area A. The secondary effective area B is exposed to the pressure of valve port V1.2 and measures in terms of value at best less than 1/100 of the primary area A. The tertiary effective area C, which is exposed to the fluid pressure at valve port V1.3 thus forms the largest effective area and corresponds to the sum of the effective areas A and B. As shown, the valve piston 20 of valve V1 is preloaded with a spring, pressed into the seat and is provided with a precision control pin. As cylinder with defined working or precision control geometries it ensures that the opened flow cross-section with commencing piston stroke is as small as possible, thus enabling the maximum possible resolution. Instead of the depicted cylindrical implementation it is possible to make the precision control pin conical or even spherical in shape.

The lock valve V2 is a solenoid-operated 2-way poppet valve in normally closed format.

The pressure-reducing valve V3 is a servo-controlled 2-way pressure-reducing valve or a pressure shut-off valve. In starting position shown in FIG. 1 the valve is open and provides the maximum flow cross-section from valve port V3.2 to valve port V3.1. As soon as the pressure at port V3.1 is exceeded, the servo control reacts and reduces the flow cross-section. The two nozzles D1 and D2 shown in FIG. 1 may be implemented in different ways, for example as orifice, restrictor, venturi nozzle or similar device.

The following describes the control process with pressure-reducing function in greater detail. The operational starting position for the control process of the unit 10 is the already mentioned minimum pressure drop between port HD and port A. If lock valve V2 is not operated there is no flow via nozzle D1, which means that the pressure present at port V1.1 of the logic valve V1 is also present via nozzle D2 at valve port V1.3 of valve V1 and at the valve port V2.1 of lock valve V2. Due to the spring force of the compression spring shown the valve piston 20 of logic valve V1 is retained in its seat and does not open up any flow cross-section. Without any volume movement the valve ports V1.2, V2.2 of logic valve V1 and of the lock valve V2 as well as the valve ports V3.1 and V3.2 of the pressure-reducing valve V3 are exposed to the pressure at port V1.2 of the logic valve V1.

The actual control process takes place as follows. Due to the electromagnetic operation of the lock valve V2, pressure medium flows via the now open cross-section via the valve ports V2.1, V3.1 from lock valve V2 and pressure-reducing valve V3 to port V1.2 of the logic valve V1. As a result of the now flowing volume via nozzle D1 a pressure drop occurs through said nozzle D1, which makes the pressure on the control surface C of logic valve V1 lower than the pressure on the control surface A of valve piston 20. As soon as the pressure drop reaches a certain specifiable value, the resulting piston force moves the piston 20 against the force of the compression spring and thus opens a flow cross-section via the logic valve V1.

Corresponding to the pressure drop, the pressure medium now begins to flow via the logic valve V1 from the valve port V1.1 to valve port V1.2 of valve V1 and thus simultaneously to port A. Due to the additional volume the pressure at the user, in this instance a the hydraulic motor 14, increases. However, the pressure at valve port V3.1 of the pressure-reducing valve V3 also rises. If this pressure reaches the pressure set at the pressure-reducing valve V3, the valve servo control begins to act and reduces the flow cross-section at the pressure-reducing valve V3.

The reducing flow cross-section now throttles the volume flow via the pressure-reducing valve V3. This, however, also reduces the volume flow via nozzle D1. This causes a reduction in the pressure drop across the nozzle D1 and thus also in the pressure drop across the logic valve V1. As a result the opening piston force is reduced and the piston 20 of the logic valve V1 reduces its flow cross-section again. This in turn causes a reduction in volume flow via the logic valve V1, which gradually reduces the pressure at the outlet A again. If said pressure drops below the value that has been set at the pressure reducing valve V3 (ignoring the hysteresis effect), it again opens up the flow cross-section, which causes the pressure drop across nozzle D1 and thus the logic valve V1 to increase and the valve V1 opens a little further. The control loop is thus closed. The above-described control process aims at equilibrium between the volume flow provided at the outlet A and the volume flow consumed by the user (hydraulic motor 14). However, said equilibrium can only be achieved if the flow cross-section opened up in logic valve V1 is always adjusted by the varying pressure drop across said valve V1. This way it is possible to provide or control the pressure that has been set via the pressure-reducing valve V3 independent from the supply pressure at port V1.1.

Analogous to the already described assembly of unit 10, in which the pressure-reducing valve V3 is implemented as a manually adjustable valve, according to FIG. 1, said valve may also be implemented as a proportional unit, as is apparent from the depiction in FIG. 3. This makes it possible, for example, to influence the set pressure via a control means during operation. The proportional unit as well as the manual adjustment option for valve V3 constitute a further servo control for the pressure-reducing valve V3, which acts upon the one control side of the respective valve spool, whereas the input side pressure at the outlet V3.1 of the valve V3 acts permanently as the other pilot control on the opposite control side of the respective valve spool of the pressure-reducing valve V3.

As FIG. 1 further shows, the unit 10 may subdivided into two sections, that is, into a servo control unit VST and a main control unit HST. The servo control unit VST comprises the nozzles D1 and D2 as well as the lock valve V2 and the pressure reducing valve V3, whereas the main control unit HST comprises essentially the logic valve V1. With the unit 10 divided in this manner it is possible to vary the main control unit HST in accordance with the power requirements on the overall unit 10 whilst retaining the servo control unit VST unchanged.

The already mentioned precision control geometry with regard to the logic valve V1 in form of a conical pin or of a specially designed cylinder extension with spline geometries, may be used as an aid for the fine-adjustment of the main control unit HST to the characteristics of the pressure source, in this instance in form of the hydraulic accumulator 12, and the user, in this instance in form of the hydraulic motor 14. This makes an impact on the flow cross-section/piston stroke characteristic in such a way so as to provide a high resolution for the closed-loop control process and yet reach a high upper performance limit. Because the unit 10 provides no passage between the ports V1.1 and V1.2 of the logic valve V1 when no power is applied, the said arrangement is designed to be "normally closed" and leak-proof. This way the unit 10 requires no further upstream or downstream lock valve, which itself would need to be adapted to the supplied volume and would cause additional pressure losses.

If the pressure reducing valve V3 of the servo control unit VST is implemented as a proportional valve as per the representation in FIG. 3, and if maximum current is applied in operation, the unit 10 as a whole may be operated as a lock valve by activating the lock valve V2 of the servo control unit VST. In this variation the unit 10 according to the representation in FIG. 1, provided with a proportional unit according to FIG. 3, can be equated with the circuit of a 2-way poppet valve in Z-format according to the depiction in FIG. 2. In this operating mode the logic valve V1 is operated with a maximum piston stroke, which means that the precision control geometry is not in action. This allows the maximum flow cross-section to be utilised and the pressure drop is reduced to a minimum.

If, as already described above, the unit 10 is implemented with a proportional pressure-reducing valve V3 operated at maximum current, and is expanded with advantageously placed lock valves R1, R2, R3 and R4 in the servo control unit VST according to the diagram in FIG. 3, and if the logic unit V1 is implemented as a unit with a pronounced control surface B at its valve port 2, it results overall in a solution with the circuit equivalent of a 2-way poppet valve in W-format according to the representation in FIG. 4. The valve V1 is also in this instance operated at maximum piston stroke without activating the precision control geometry, which allows the maximum flow cross-section to be utilised and the pressure drop can be lowered to a minimum, which from an energy point of view is particularly advantageous.

Particularly preferred according to the representation in FIG. 1, the unit 10 is used to operate a hydraulic motor 14 with constant pressure, supplied from a variable pressure source such as a hydraulic accumulator 12, for example as a wheel hub motor of a trailer axle 16.

With help from the multi-functional valve group V1, V2, V3 it is also possible to utilise the hydraulic energy from the hydraulic accumulator 12 to raise the pressure level of the suction line 22 of a hydraulic pump (not shown in detail) as the hydraulic user, so that the suction side of the hydraulic pump is preloaded in a closed circuit, for example within the arrangement of a hydrostatic traction drive (boost mode). To this end it must be ensured that the constant volume flow that is demanded by the suction side of the pump can be drawn fully from the accumulator 12 via the described unit 10. Moreover, with a large pressure drop between accumulator 12 and the supply pressure at the suction side, the unit 10 must have a correspondingly high precision control capability so as to avoid grave [sic] volumes—and consequently avoid pressure fluctuations upstream of the pump. The aim is the adjustability of a supply pressure that is higher than the ordinary preload pressure of the pump to minimise the pressure drop across the pump at increased load.

In addition to the above-described pressure-reducing function in boost mode of the traction drive it is also possible to recharge the accumulator unit 12 through reversing the flow direction with the unit 10 according to the representation in FIG. 3. To this end the smallest possible pressure drop across the unit 10 is desirable, not least on account of energy efficiency.

The circuit diagrams shown in FIGS. 5 and 6 are embodying basically the same supply logic. The circuit diagram in FIG. 6 corresponds essentially to that of the divided unit 10 with servo control unit VST and main control unit HST depicted in FIG. 1. In the circuit diagram according to FIG. 5 the pressure reducing valve V3 has been resolved as per FIG. 6 into a valve with a pressure maintenance function, embodied through said valve V3, and a pressure-reducing function embodied by valve DB1.

For use in such traction drives it is, moreover, advantageous to provide a separate hydraulic accumulator ACC with an upstream nozzle D4 from which it is directly connected with the outlet line to the outlet port A. This arrangement has proven to be particularly advantageous for the already described boost function. It has shown that the hydraulic accumulator ACC is of great advantage as buffer for pressure control purposes. In its function it compensates for shortcomings in precision control, compensates for too large volume changes in the said outlet line and thus stabilises the pressure provided. Only this makes it possible for the control function via the unit 10 to operate energy-efficiently at all. The upstream nozzle D4 mentioned above throttles the flow volume.

The pressure-reducing valve according to the invention differs from the known solutions in that a 2-way solution is implemented, which means that no pressure relief is required to a third, further port. The solution according to the invention has a leak-proof seal, not a spool seal like the known solutions. Moreover, implemented is not a cartridge solution but rather a valve solution, which may be separated into a servo and main control unit. This has no equivalent in the prior art.

The invention claimed is:

1. A valve device with pressure-reducing function, comprised of at least one
   one logic valve V1);
   one lock valve (V2); and
   pressure-reducing valve (V3);
wherein the inlet (1) of the logic valve (VI) is connected to a pressure supply source (HD), characterized in that the outlet (VI.2) of the logic valve (VI) and the outlet (V3.1) of the pressure reducing valve (V3) are connected together to an outlet or user port (A); and that the lock valve (V2) is connected with its inlet (V2.1) to the inlet (VI.1) of the logic valve (VI) as well as to a control side (VI.3) of the same, and with its outlet (V2.2) to an inlet (V3.2) of the pressure-reducing valve (V3).

2. The valve device according to claim 1, characterized in that the inlet-side pressure at outlet (V3.1) of valve (V3) acts as the one servo control unit on one of the control sides of the pressure-reducing valves (V3), and a further servo control unit acts on an opposite control side of said valve (V3).

3. The valve device according to claim 1, characterized in that the further servo control unit of the pressure-reducing valve (V3) is connected to a drainage connection (ND) to discharge the servo control oil.

4. The valve device according to claim 1, characterized in that a nozzle (D1, D2) is disposed in each of the connecting lines between the input side (V1.1) as well as the control side (V1.3) of the logic valve (V1) and the common input side (V2.1) of the lock valve (2).

5. The valve device according to claim 3, characterized in that at least the lock valve (V2) together with the pressure-reducing valve (V3) and the two nozzles (D1, D2) form a servo control unit (VST) for an exchangeable main control unit (HST) with the logic valve (1).

6. The valve device according to claim 1, characterized in that a further connection line with a nozzle (D3) is disposed between the input side (V2.1) of the lock valve (V2) and the output side (V3.1) of the pressure-reducing valve (V3), and that at the outlet side of nozzle (D3) a non-return valve (R3) is disposed that opens in the direction of the nozzle (D3).

7. The valve device according to claim 3, characterized in that the nozzle (D1) is connected via a connecting line to a non-return valve (R1), which opens in the direction of nozzle (D1), and a further non-return valve (R2), which opens in the direction of the first non-return valve (R1), to the output side (V2.2) of the lock valve (V2).

8. The valve device according to claim 1, characterized in that the valve device is designed as a 2-way poppet valve in W-form or Z-form.

9. A hydraulic motor with a valve device according to claim 1, characterized in that it is connected with its fluid side to an outlet port (A), and that a hydraulic accumulator (ACC) has the function to accelerate said hydraulic motor, wherein said hydraulic accumulator unit (ACC) is connected via a corresponding port connection (ACC) of the valve device to the output side (V1.2) of logic valve (V1) and the output side (V3.1) of the pressure-reducing valve (V3).

* * * * *